Oct. 12, 1965  E. H. BURK, JR., ETAL  3,211,798
METHOD FOR TRANSALKYLATION AND ISOMERIZATION OF METHYL BENZENES
Filed June 21, 1962
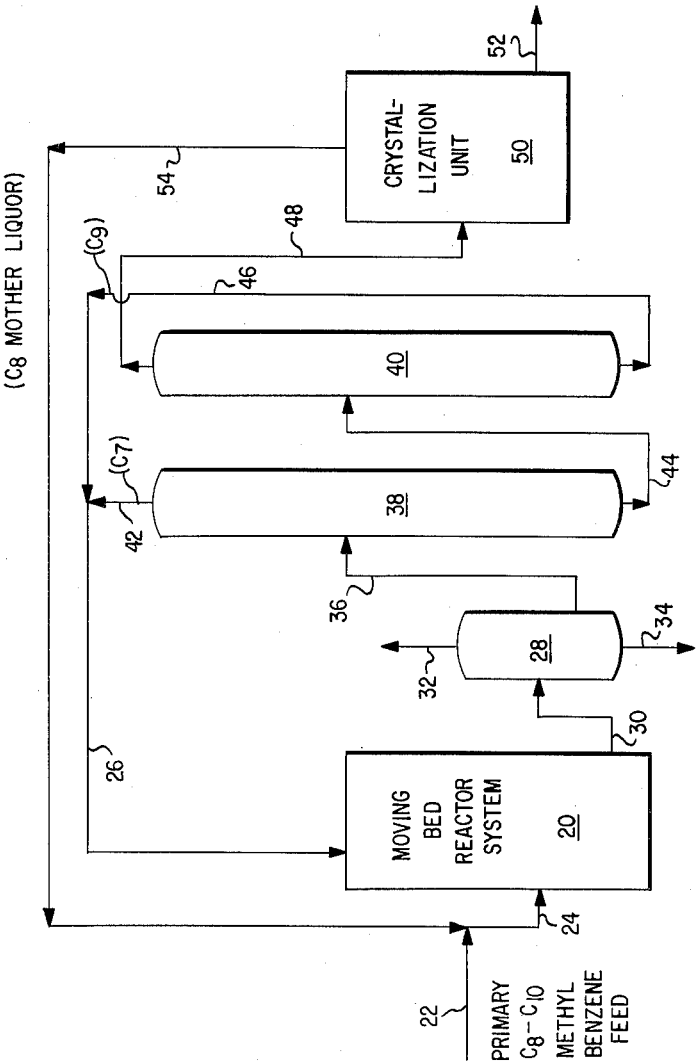
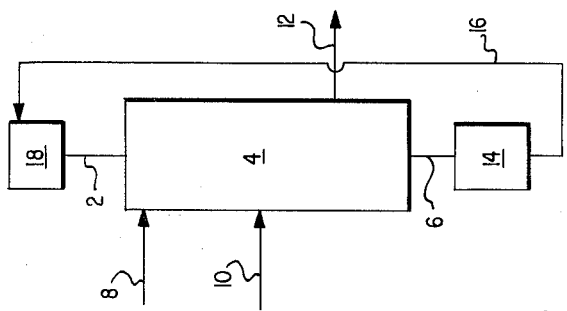
INVENTORS.
EMMETT H. BURK, JR.
BY  OWEN H. THOMAS
Adams, Forward, and McLean
ATTORNEYS.

# United States Patent Office 3,211,798
Patented Oct. 12, 1965

3,211,798
METHOD FOR TRANSALKYLATION AND ISOMERIZATION OF METHYL BENZENES
Emmett H. Burk, Jr., Hazel Crest, and Owen H. Thomas, South Holland, Ill., assignors to Sinclair Research, Inc., Wilmington, Del., a corporation of Delaware
Filed June 21, 1962, Ser. No. 204,186
7 Claims. (Cl. 260—668)

This invention relates to the catalytic transalkylation-isomerization of methylated aromatic hydrocarbons, and in one particular aspect to the conversion of dimethyl benzenes such as xylene, in a moving bed catalyst reactor system.

The isomerization of any given alkylated aromatic hydrocarbon, for instance, xylene or mixtures thereof, to other isomeric forms is a reaction well known in the art as described, for example, in U.S. Patents 2,403,757 to Reeves or 2,564,388 to Bennett et al. which typify fixed catalyst bed reaction systems. Certain disadvantages, however, are associated with such systems, for instance, catalyst aging and excessive formation of coke on the catalyst, which necessitate frequent periodic catalyst regeneration procedures to increase the ultimate recovery of xylenes. During these regenerations the hydrocarbon feedstock is not processed and valuable on-stream time is lost.

It has now been found that under selected conditions in a moving bed system, a significant improvement in transalkylation-isomerization may be achieved with a methylated benzene feedstock having a total average carbon atom content of about 8–10, especially $C_8$ and $C_9$ methyl benzenes. In the moving bed procedure, catalyst is moved as a compact mass in an essentially single direction such as from a catalyst inlet to an outlet, through a hydrocarbon conversion zone, and is usually circulated as a compact moving mass through successive stages of hydrocarbon conversion and catalyst regeneration. Between the conversion and regeneration zones the catalyst may or may not be transported as a compact mass. The bed can be moving in any direction for instance, upwardly or it can gravitate downwardly through a hydrocarbon conversion zone, either concurrently or counter-currently with the hydrocarbon material and with a minimum of backmixing between the hydrocarbon material and the catalyst. The hydrocarbon material essentially moves in one direction from feed inlet to product outlet. The moving bed procedure can be distinguished from a fluidized bed employing powdery catalytic material which does not move through a conversion zone as a compact mass and involves a considerable degree of backmixing between the catalyst and hydrocarbon material in the conversion zone thereby lowering the rate of reaction and isomerization selectivity.

It has been found that in a moving bed process advantageously high ultimate selectivities to, for instance, para-xylene, may be attained when the moving bed reactor provides successive transalkylation and isomerization zones and the proper hydrocarbons are chosen as feed for each of these reactions. Thus, first or primary $C_8$ to $C_{10}$ methyl benzenes are charged to the mid-portion of the catalyst bed and conveyed either concurrently or countercurrently to the catalyst, along the catalyst bed and reactor until the hydrocarbon reaches a product outlet. During this passage the feed, which is lean in a desired isomer, is isomerized to give a product containing greater quantities of the wanted component.

At the same time $C_7$ to $C_{11}$ or secondary methyl benzenes boiling above and below the primary feed, e.g. containing components having one less and one more carbon atom, are passed to the catalyst bed at a position further removed from the product outlet than the inlet for the primary feedstock. The secondary benzenes are transalkylated while moving toward the primary feed inlet thereby increasing the amount of available desired product and its isomers for conversion while traversing the isomerization zone to the product outlet.

In an advantageous system, the lower and higher boiling hydrocarbons are isolated from the desired product and its isomers and the wanted isomer is isolated in relatively pure form as by crystallization. The crystallization mother liquors can constitute feed to the isomerization zone of the catalyst bed while the lower and higher boiling hydrocarbons are recycled to the transalkylation zone.

A primary feedstock found suitable for the practice of this invention is as stated above, a methylated benzene having a total average carbon atom content of about 8 to 10 carbon atoms. For instance, one which may be described as an ethylbenzene lean meta-xylene concentrate was appropriately utilized. Such a feedstock may contain, for example, about 70 to 85% meta-xylene, about 0 to 5% ethylbenzene, about 0 to 10% ortho-xylene, the balance being substantially para-xylene. The individual xylenes alone may also be used. Other feedstocks which are suitable for use in this invention to produce products other than, for instance, paraxylene, comprise, for example, pseudocume to yield mesitylene. Similarly other $C_8$, $C_9$ and $C_{10}$ methylated benzenes can be employed to produce their isomeric forms. In any event the overall feed to the isomerization zone of the moving bed is not an equilibrum mixture of the various isomers concerned since such mixture could significantly hinder or prevent isomerization. Usually the primary feed is composed predominantly or even substantially entirely of components of the same number of carbon atoms, e.g. a heart or close cut fraction. The feed may contain up to about 25 or even about 30% of benzenes substituted with alkyl groups of 2 or more carbon atoms but preferably this amount is less than about 10%.

Where, for instance, paraxylene is the product desired, the hydrocarbon conversion reaction is, essentially, a two-zone reaction, wherein the first zone the reaction is transalkylation of a $C_7$ and $C_9$ methyl benzene charge to $C_8$ aromatics and where in the second zone the main reaction is the isomerization of $C_8$ aromatics from the first zone and from an independent, essentially $C_8$ aromatic charge. In this second zone there is also some disproportionation of the hydrocarbon material, but because of the conditions existing in each zone, the amount of disproportionation is controlled so as to produce an unexpectedly favorable over-all reaction rate of the isomerization of the charge to para-xylene.

In the moving bed procedure as described in FIGURE 1, hot catalyst is continuously circulated as a compact mass through a treating system having alternate stages of hydrocarbon conversion and catalyst regeneration. The catalyst is introduced by way of line 2 into the top of a conversion zone (reactor) 4, gravitates downwardly through the conversion or reaction zone and is removed from the bottom of the zone by way of line 6. In the process of the present invention, the aromatic recycle feed for transalkylation can be introduced into the upper portion of the conversion zone through line 8 and may be conducted concurrently with the flow of the catalyst. In the xylene system, feed to transalkylation will consist essentially of $C_7$ and $C_9$ materials. In the upper zone of the reactor, since this material is not at thermodynamic equilibrium, $C_8$ material will be formed by methyl group transfer (transalkylation) from the $C_9$ to the $C_7$ material until near thermodynamic equilibrium is attained. In the upper zone of this concurrent flow operation this transalkylation reaction usually is favored because of the relatively low level of coke on the fresh or regenerated catalyst introduced through line 2 and the high catalyst to oil ratio existing therein.

The $C_8$ feed mixture comprising a crystallization mother liquor recycle stream and a fresh ethylbenzene lean-meta-xylene concentrate charge is introduced through line 10, so it flows downward. The $C_8$ material concentration is now well above thermodynamic equilibrium and the $C_8$ material will tend to disproportionate and form $C_7$ and $C_9$ hydrocarbons at a relatively slow rate with the desired isomerization reaction proceeding much faster. By the proper choice of conditions in each of the zones the desired reactions can be maximized. The product is recovered through line 12. The catalyst removed through line 6 can be conducted to, and regenerated in, regenerator 14, lifted by air lift 16, to separator surge 18 and introduced into line 2 for reuse in the system. An $N_2$ or steam seal can be used in line 2 and line 6.

The catalyst employed in the process can be easily regenerated employing conventional procedures to remove carbon deposited thereon, for instance by subjecting it to an oxygen-containing gas at temperatures sufficient to burn carbon off the catalyst. This oxygen-containing gas, e.g. an oxygen-nitrogen mixture, often contains about 0.01 to 5 weight percent oxygen, preferably about 0.5 to 1.5 weight percent, and is introduced at a flow rate such that the maximum temperature at the site of combustion is usually below about 1000° F.

Any portion of the lighter and heavier products may be recycled to the transalkylation zone and advantageously it has been found that such a recycle feed to fresh feed-crystallization mother liquor recycle feed ratio is usually less than about 2 and generally not below about 0.1. Most often the ratio will be about 0.3 to 1:1. Other conditions maintained in the practice of the present invention to effect the desired reactions usually include a temperature sufficient to maintain the aromatic feeds in the vapor phase under the pressure employed. For instance in the transalkylation zone the temperature maintained is usually from about 400–1200° F., preferably from about 900–1200° F. A catalyst to oil ratio charged to this zone may be from about 0.5 to 10:1 and preferably about 1 to 5:1. The pressure may range from about atmospheric pressure or less up to about 100 p.s.i.g. preferably about atmospheric pressure. The same pressure conditions are also maintained in the second, or isomerization zone as well as the space velocity, which in each instance will be from about 0.1 to 20, preferably from about 0.5 to 5, with an advantageous value being about 1 to 2 weights of aromatic per weight of catalyst per hour (WHSV). The temperature maintained in the isomerization zone is usually from about 600 to 1100° F., preferably from about 800 to 975° F., and will give a vapor phase operation. The catalyst to oil ratio for this zone is generally from about 0.5–10 and preferably 0.5–3.0.

As stated before the reactor used in the practice of this invention comprises two zones, i.e. a transalkylation zone and an isomerization zone. The feed charged to the transalkylation zone is introduced to the reactor at essentially the initial location of hydrocarbon flow. The feed to the isomerization zone is charged to the reactor at a point intermediate the transalkylation zone hydrocarbon inlet and the reactor product outlet. Generally this point will be at a distance from about 25–90%, preferably 40–70% downstream from the transalkylation zone hydrocarbon inlet. Since in many instances little if any heavier or lighter product need be made in our overall operation the average molecular weight of the transalkylation feed will appproximate the average molecular weight of the primary or isomerization feed, e.g. may be within about ±0.1 carbon atom.

Catalysts which can be employed in accordance with the present invention include solid inorganic acidic transalkylation-isomerization catalysts. The catalysts include synthetic gel-type catalysts, for instance those described in U.S. Patent Nos. 2,384,505 and 2,542,190, hereby incorporated by reference and clay catalysts. Advantageously, calcined silica-based or silica-containing catalysts, for instance, those containing a major proportion, at least about 50%, of silica and minor amounts of solid acidic metal or non-metal oxides, may be employed.

Silica-alumina catalysts represent the preferred class of catalysts because of their low cost, regenerability, high rate of conversion obtained and their stability at the operating conditions employed. The synthetic gel-type of silica-alumina catalyst, such as the co-precipitated silica-alumina and the alumina precipitated on silica type may be used. Popular synthetic gel catalysts generally contain about 10 to 30% alumina, for instance about 12% alumina. The catalyst is supplied, preferably, in the form of spheroidal bead-like particles, which form is ideally suited to the continuous flow of a moving bed system. Advantageously, Socony "Durabead" catalysts may be used. Such catalysts, preferably are supplied as macrosize particles having a catalytic area of about 10 to 300 m.$^2$/g., preferably from about 100 to 200 m.$^2$/g. and average pore radii of about 20 to 70 A. in order to minimize pore diffusional effects which lower the ultimate selectivity of the isomerization reaction products. The macrosize catalyst particles usually have diameters in the range of about 1/16 to 3/8 inch.

FIGURE 2 of the drawing illustrates the moving bed procedure of FIGURE 1 in connection with an advantageous system for practicing the present invention. An ethylbenzene lead meta-xylene concentrate feed in line 22 is combined with crystallization mother liquor recycle in line 24 and charged to the reactor 20. An aromatic fraction recycle feed, e.g. $C_7$ and $C_9$ aromatic hydrocarbons, is conducted through line 26 into the moving bed reactor system 20. Product from system 20 is passed to flash drum 28 by way of line 30, gas is released through line 32, a water phase is removed through line 34. An aromatic liquid phase from the flash drum is conducted through line 36 to a first tower 38 of a two-tower heartcut fractionation system also including a second tower 40. The top stream from the first tower containing aromatic products, for instance, $C_6$ and $C_7$ aromatics, boiling lower than the desired product, for instance, para-xylene, is conducted through the line to recycle line 26. The bottoms from tower 38 is conducted through line 44 to tower 40 where aromatic compounds, for instance, $C_9$ aromatics heavier than, for instance, para-xylene, are conducted through line 46 to recycle line 26. The overhead from tower 40 which contains a high concentration of the desired product, for instance, para-xylene in this instance, is conducted through line 48 to crystallization unit 50 where high purity para-xylene is recovered through line 52 and para-xylene crystallization mother liquor is conducted through line 54, combined with primary feed of line 22 in line 24 and charged to the moving bed reactor system 20.

The following examples will serve to illustrate the present invention but they are not to be considered limiting.

*Example 1*

A regenerated 42 Activity Index (CAT A) Socony "Durabead" silica-alumina catalyst is charged to a 1″ I.D. moving bed reactor. The catalyst is preheated to 950° F. before it enters the reaction zone which is maintained at 950° F. The feed, an ethylbenzene lean meta-xylene concentrate, contains by weight 0.5% toluene, 3.5% ethylbenzene, 13.2% para-xylene, 74.2% meta-xylene, 7.8% ortho-xylene and 1.0% 1,2,4-trimethylbenzene. The feed is also preheated to 950° F. before it enters the isomerization reaction zone. The feed is charged at a rate such that the WHSV is about 2.04 and the catalyst to oil weight ratio is 1.16. The feed and catalyst flow concurrently through the reaction zone to the outlet where the hydrocarbon is stripped from the catalyst by nitrogen that flows countercurrent to the catalyst and hydrocarbon at the rate of 0.54 cu. ft. per hr. The liquid product is collected and analyzed by infrared and gas chromatography. The results of this run are as follows:

*Liquid product (weight percent)*

| | |
|---|---|
| Benzene | 0.8 |
| Toluene | 9.8 |
| Ethylbenzene | 2.3 |
| Para-xylene | 17.2 |
| Meta-xylene | 42.2 |
| Ortho-xylene | 16.2 |
| Ethyltoluene | 0.3 |
| 1,3,5-trimethylbenzene | 2.6 |
| 1,2,4-trimethylbenzene | 6.5 |
| 1,2,3-trimethylbenzene | 1.0 |
| Ethylxylene | 0.2 |
| Total other $C_{10}$ | 0.6 |
| | 99.7 |
| Percent $C_8$'s remaining | 78.9 |
| Para-xylene in xylenes | 22.7 |
| Percent of equilibrium (xylenes) | |
| Para-xylene | 94.7 |
| Meta-xylene | 82.6 |
| Ortho-xylene | 76.0 |

*Example II*

The above catalyst was regenerated and again charged to the moving bed reactor for processing at the same conditions defined above. The feed comprised the non-$C_8$ fraction of the above liquid product and an ethylbenzene lean meta-xylene concentrate which contained, by weight, 0.8% benzene, 10.3% toluene, 0.3% ethyltoluene, 2.6% 1,3,5 - trimethylbenzene, 7.6% 1,2,4 - trimethylbenzene, 1.0% 1,2,3-trimethylbenzene, 2.5% ethylbenzene, 6.1% ortho-xylene, 58.3% meta-xylene and 10.5% para-xylene.

The combined feed stream was introduced to the isomerization zone in contradistinction to the procedures of this invention wherein the non-$C_8$ fraction is introduced to a transalkylation zone of the reactor which is upstream from the point of introduction of the ethylbenzene-lean meta-xylene inlet to the isomerization zone. The liquid product of this run showed that the non-$C_8$ fraction was approximately 35% weight with the para-xylene content in the xylene fraction being approximately 23%. The product distribution indicated that the non-$C_8$ fraction of the feed was substantially unreacted with the additional 15 weight percent of non-$C_8$'s formed from the approximate 20% transalkylation of the $C_8$ fraction of the ethylbenzene-lean meta-xylene concentrate feed.

*Example III*

The regenerated 42 Activity Index (CAT A) Socony Durabead Si-Al catalyst is charged to a modified one inch I.D. moving bed reactor which has provision for dual feed entry into the reaction zone. Into the top of the moving bed unit the non-$C_8$ aromatics formed in Example I are added at the following conditions: 1000° F., 1 WHSV, and 5/1 catalyst to oil ratio. Approximately 40% of the $C_7$ and $C_9+$ aromatics undergo transalkylation to $C_8$ aromatics. At a point midway in the bed this product mixes with incoming $C_8$ aromatics and passes through the remaining moving bed zone which is at 950° F., 2 WHSV, and 1/1 catalyst to oil ratio. In this zone 20% of the $C_8$ aromatics present are transalkylated and the p-xylene content in xylenes is again approximately 23%. The total amount of xylenes in the effluent from the bottom of the reactor is approximately 62% at steady state. In such a system as this there is little to no loss of $C_8$ aromatics to transalkylate since it is recycled back to reform $C_8$ aromatics via the special transalkylation zone.

It is claimed:

1. In a process for converting methyl benzenes by transalkylation and isomerization in a reaction zone through which solid transalkylation-isomerization catalyst passes as a compact, moving bed to provide successive transalkylation and isomerization in said reaction zone the steps which comprise introducing methyl benzene feed of 8 to 10 carbon atoms lean in a desired isomer, into the mid-portion of said catalyst bed and passing said feed to a product outlet located along said bed from said mid-portion to isomerize said feed at a temperature of about 600 to 1100° F., charging methyl benzenes of lesser and greater number of carbon atoms than said feed to said catalyst bed at a hydrocarbon inlet further from said product outlet than said mid-portion to effect transalkylation at a temperature of about 400 to 1200° F., said mid-portion containing about 25 to 90% of the catalyst in said bed between said hydrocarbon inlet and said product outlet, and recovering isomerizate from said product outlet.

2. The method of claim 1 in which said methyl benzenes of lesser and greater number of carbon atoms are separated from said isomerizate.

3. The method of claim 2 in which a desired isomer of said feed is separated from said isomerizate and remaining isomer of said feed is recycled to said mid-portion.

4. The method of claim 3 in which the catalyst is silica-alumina bead.

5. The method of claim 4 in which the desired isomer is separated by crystallization.

6. The method of claim 5 in which said mid-portion contains about 40 to 70% of the catalyst between said hydrocarbon inlet and said product outlet.

7. The method of claim 6 in which the isomer crystallized is para-xylene.

References Cited by the Examiner

UNITED STATES PATENTS

| | | | |
|---|---|---|---|
| 2,403,757 | 7/46 | Reeves | 260—668 |
| 2,656,397 | 10/53 | Holzman et al. | 260—668 |
| 2,756,261 | 7/56 | Fetterly | 260—668 |

ALPHONSO D. SULLIVAN, *Primary Examiner.*

PAUL M. COUGHLAN, JR., *Examiner.*